United States Patent

Nii et al.

[11] Patent Number: 5,804,947
[45] Date of Patent: Sep. 8, 1998

[54] GENERATOR CONTROLLER USED IN HYBRID ELECTRIC VEHICLE

[75] Inventors: Yoshihide Nii, Fuji; Nobuyuki Taki, Toyota, both of Japan

[73] Assignee: Toyota Jidosha Kabushiki Kaisha, Toyota, Japan

[21] Appl. No.: 545,291

[22] Filed: Oct. 19, 1995

[30] Foreign Application Priority Data

Dec. 22, 1994 [JP] Japan .................................. 6-320332

[51] Int. Cl.⁶ .................................................. H02P 11/06
[52] U.S. Cl. .............................. 322/16; 318/153; 322/39
[58] Field of Search .............................. 322/16, 22, 28; 290/16; 318/153

[56] References Cited

U.S. PATENT DOCUMENTS 5,359,228 10/1994 Yoshida ...................................... 290/17

FOREIGN PATENT DOCUMENTS

| 334 474 A2 | 9/1989 | European Pat. Off. . |
| 543 390 A1 | 5/1993 | European Pat. Off. . |
| 41 16 899 A1 | 11/1991 | Germany . |
| A-5-153703 | 6/1993 | Japan . |
| 5-328522 | 12/1993 | Japan . |
| 6-93892 | 4/1994 | Japan . |
| 6-141406 | 5/1994 | Japan . |

Primary Examiner—Steven L. Stephan
Assistant Examiner—Nicholas Ponomarenko
Attorney, Agent, or Firm—Oliff & Berridge, PLC

[57] ABSTRACT

A generator controller used in hybrid electric vehicle. The battery current is sampled and accumulated for T seconds. The obtained accumulated value is used to determine the control target of the generated power. Since the generated power is controlled according to the accumulated current of the battery which fits the battery's characteristic compared to the charged-and-discharged power, the battery's state of charge (SOC) can be more accurately controlled within the target zone. When the SOC of the battery is initially outside the target zone, the SOC is adjusted within the target zone by forcibly discharging or charging the battery. The precision of SOC control can be improved compared to when the SOC of the battery is controlled using the charged-and-discharged power.

20 Claims, 7 Drawing Sheets

Ia : AVERAGE BATTERY CURRENT
Ta: AVERAGING PERIOD

GENERATOR CONTROLLER USED IN HYBRID ELECTRIC VEHICLE

BACKGROUND OF THE INVENTION a) Field of the Invention

This invention relates to a hybrid electric vehicle in which a motor, battery and generator are installed, in which the motor is capable of being driven by the generator's output power and the battery is capable of being charged by the generated power. This invention relates more particularly to a generator controller which controls the generator in the hybrid electric vehicle.

b) Description of the Prior Art

As a system composition of an electric vehicle, the composition in which an engine is installed, as well as the motor, is known as a hybrid vehicle. Among plural types of hybrid vehicles, in the vehicle which is a so-called series hybrid vehicle (SHV), the generator is driven by the engine, and the output power of the generator (hereinafter referred as generated power) is used for driving the motor and charging the battery installed in the vehicle. Therefore, in the SHV, the motor is driven by not only the battery's discharged power but also the generated power. Furthermore in the SHV, besides the regenerated power from the motor and the external power, the battery is charged by the generated power.

As the battery installed in the vehicle, a secondary battery, such as a lead battery which can be charged and discharged, is normally used. When using the lead battery, it is preferable to maintain and control the state of charge (SOC) of the battery within the 70–80% range. By carrying out this type of SOC control, the battery life can be extended.

In the SHV, by controlling the generated power, it is possible to carry out this type of maintenance and control of the SOC. For example, under normal driving conditions, the driving power required by the motor is exclusively provided by the generator only. When the driving power can not be provided solely by the generator, e.g. the accelerator pedal is rapidly depressed, the discharged power of the battery is used. In this way, the frequent discharging of the battery can be prevented, so frequent charging by the external power source can be avoided, and the loss through discharge efficiency can be reduced. Furthermore, since the used discharged power can be compensated by the generated power later when extra power can be provided by the generator, it is possible to maintain the SOC of the battery within the target zone.

However, in the SOC control which focuses on the motor's driving power, a certain amount of control error can not be avoided. That is, since the battery is essentially a component that stores electric charge, the state of charge does not change according to the accumulated charged-and-discharged power, but changes according to the accumulated charged-and-discharged current. Therefore, using the generated power control above, it is difficult to maintain the SOC of the battery within the target zone precisely. Regarding the generated power control, see Japanese Patent Laid-Open Publication No. Hei 6-93892.

SUMMARY OF THE INVENTION

The first object of this invention is to control the SOC of the battery within the target zone more precisely than in the prior art by setting the target generated power based on the accumulated charged-and-discharged current or the surplus and shortage of the generated output of the generator.

The second object of this invention is to eliminate the setting error of the initial SOC and to control the SOC of the battery more precisely, by accurately detecting the SOC of the battery prior to the control of the generated power.

The third object of this invention is to force the initial SOC to the value in the target zone by setting the target generated power to a specific value when the SOC which was detected prior to the control of the generated output is outside the target zone and to enable the SOC of the battery to be precisely controlled and maintained in the target zone.

The fourth object of this invention is to securely prevent excessive discharge of the battery by setting the value of the concerned enforced target to a value belonging to a specified range.

The fifth object of this invention is to more securely enable the extension of battery life by achieving each of the object mentioned above.

The first aspect of this invention is a generator controller used in a hybrid electric vehicle which comprises a motor for driving the vehicle, a battery which can be charged and discharged, and a generator. In this hybrid electric vehicle, the motor is driven by the power discharged from the battery, and hence the vehicle is driven. Furthermore, the generator generates the power according to the value of a command. When driving the motor, the power generated by the generator is used for driving the motor, as well as the power discharged from the battery. The power generated by the generator, furthermore, is used to charge the battery. The generator is driven, for example, by the engine.

In the first aspect of this invention, first of all, the change in the SOC of the battery is detected, based on the detected value of the battery's charging and discharging currents. Secondly, the target generated power is determined based on the SOC change. Then, according to the target generated power, output of the generator is controlled. Since the charging and discharging currents reflect the change in the SOC as described above, the SOC can be accurately controlled within the target zone when the generated power is controlled based on the charging and discharging currents, compared to when the generated power is controlled based on the accumulated charged-and-discharged power.

In the second aspect of this invention, the accumulated charged-and-discharged current of the battery can be obtained by accumulating the detected value of the charged-and-discharged current of the battery for every predetermined time period. The accumulated charged-and-discharged current which is obtained represents the change in the SOC of the battery. When the accumulated charged-and-discharged current is obtained, the target generated power is determined based on this. In this aspect, the generated power is controlled according to the target generated power determined in this manner. In this manner, within this aspect, the SOC of the battery is maintained and controlled within the target zone precisely compared to when the target generated power is determined based on the charged-and-discharged power, since the target generated power is determined based on the accumulated charged-and-discharged current.

Furthermore, in this aspect, prior to the control operation mentioned above, the detection and adjustment of SOC are carried out, for example, when the vehicle is started. In this case, the target generated power is forcibly set at a value less than or equal to the motor's driving power, for example, 0. Controlling the generator's output power according to the target generated power while driving the motor causes a shortage in the generator's output power which is needed to drive the motor and this shortage is compensated by the battery discharge. When continuing the enforced discharge of the battery, the high rate discharging state, that is, the condition in which the discharged current of the battery is greater than the predetermined value and the variation rate of the discharge current over time is positive, arises. It is known to the ordinary skilled person that the voltage and the SOC of the battery have a good correlation under this condition. Therefore, based on the voltage of the battery in the high rate discharging state which can be detected based on the battery's charging and discharging currents, the SOC at that point can be obtained.

In this aspect, if the SOC obtained in this manner is greater than the target zone's upper limit value, the target generated power is forcibly set at a value less than the driving power, since it is necessary to discharge the battery in succession. In this aspect, furthermore, the decision of the target generated power is permitted based on the battery's accumulated charged-and-discharged current in case the battery's SOC reaches the target zone, as a result of the above. That is, when the battery's SOC reaches the target zone, the target generated power is determined based on the battery's accumulated charged-and-discharged current, and the generated power is controlled according to the determined target generated power as mentioned above. Therefore, in this aspect, even when the battery's SOC is greater than the target zone's upper limit value in the initial stage of control, this can be adjusted and corrected to the target zone range; there-fore, the deterioration of the SOC control precision due to the initial SOC error can be prevented. As a result, the condition of a high SOC, that is, the condition of a poor charging and discharging efficiency, can be avoided at an early stage, and an improvement in fuel consumption and battery life extension can be achieved.

In this aspect, alternatively, if the battery's SOC obtained under the high rate discharging state produced in the initial stage of control is less than the lower limit value of the target zone, the target generated power is forcibly set at the maximum possible generated power which can be obtained from the generator, or the value equal to the motor's driving power. When this type of target generated power setting is done, the charging of the battery will eventually start through the generated power. As a result, when the battery's SOC reaches the target zone, the determination of the target generated power based on the battery's accumulated charged-and-discharged current is permitted. Therefore, even when the battery's SOC in the initial stage of control is less than the target zone's lower limit, since this can be adjusted to the target zone, the SOC management precision can be maintained regardless of the error of the initial SOC. Therefore, the tendency for the battery to become excessively discharged can be prevented, and the prevention of the lack of motor output, as well as extension of battery life, can be achieved.

The value to be forcibly set for the target generated power in the initial control can be, for example, 0 or greater than 0. When the value is set at greater than 0, even if the high rate discharging state does not occur after a long period of time elapses, excessive discharge of the battery is not likely to occur, since the generated power is obtained from the generator, although it is insufficient to provide the driving power of the motor. Therefore, in this case, the battery life can be further extended.

The third aspect of this invention is the generator controller used in the hybrid electric vehicle which is the same as the first and second aspect, and is equipped with means for obtaining an average of the charging and discharging currents of the battery in a recent predetermined period, means for obtaining surplus and shortage of the generated power based on the average, means for determining the target generated power based on the surplus and shortage of the generated power, and means for controlling the generated output according to the target generated power.

That is, in the third aspect of this invention, the average of the charging and discharging currents of the battery during the predetermined period is obtained. This average reflects the change in the battery's SOC within the concerned period. There exists a predetermined relationship between this average and the surplus and shortage of the generated power, so it is possible to obtain the surplus and shortage of the generated power based on the average of the battery's charging and discharging currents. When the surplus and shortage are obtained, the target generated power is determined based on this surplus and shortage, and the generated power is controlled according to this target generated power. Therefore, in this aspect also, the SOC control can be carried out with satisfactory precision compared to when the battery's SOC control is carried out by focusing on the battery's accumulated charged-and-discharged power.

DETAILED DESCRIPTION OF THE PREFERRED EMBODIMENTS

Below, an explanation follows based on the figures regarding the preferred embodiments of this invention.

a) System Composition

Figure 1:
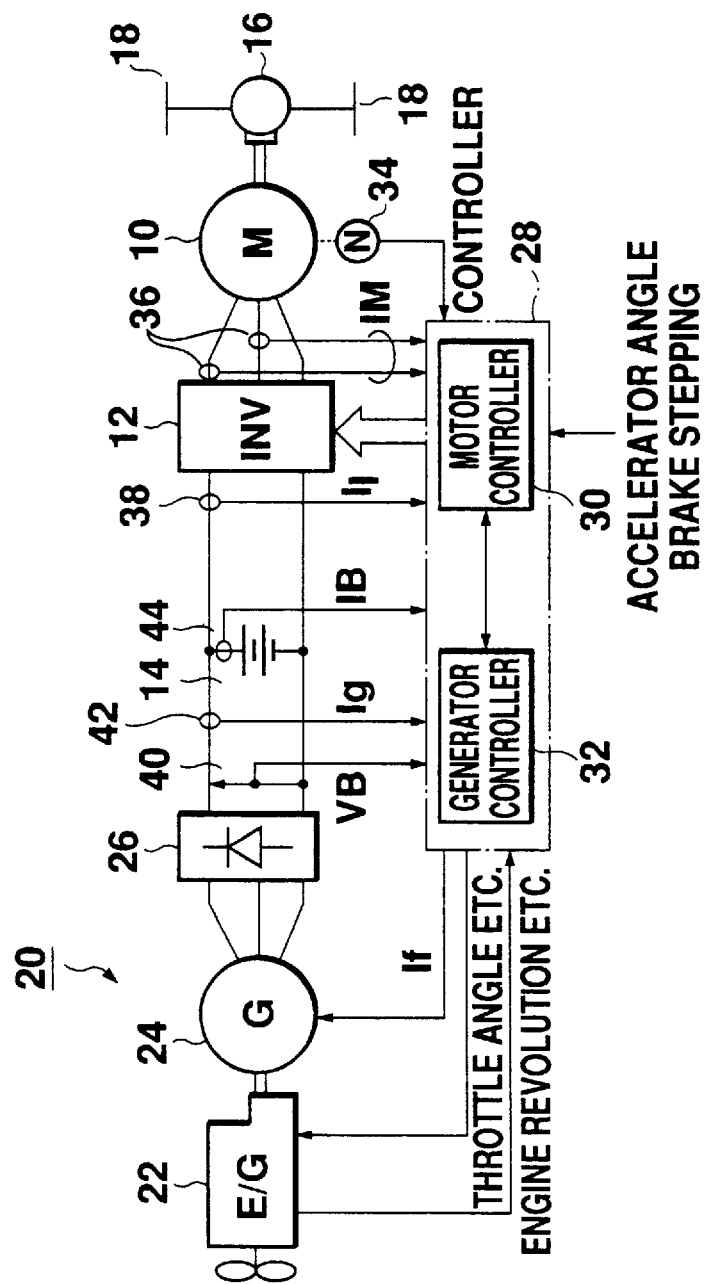
FIG. 1 is a block diagram showing the system composition of the SHV suitable for carrying out this invention.

FIG. 1 shows the system composition of the SHV embodying this invention. The motor 10 for driving the vehicle in this system is a three phase alternating motor, and receives the driving power from a battery 14 through an inverter 12, which converts the discharged power of the battery 14 from direct current to three phase alternating current. The motor 10 is rotationally driven by this driving power. The output shaft of the motor 10 is connected to driving wheels 18 through the differential gear 16 and the like, and as a result, the vehicle travels when the motor 10 is rotationally driven.

Furthermore, as a driving power source of the motor 10, the engine driven generator 20 is installed, as well as the battery 14. The engine driven generator 20 is comprised of an engine 22 which is generally driven in the wide-open-throttle (WOT) condition and a generator 24 which is rotated by the mechanical output of the engine 22. When the field current If is supplied to this generator 24 under the condition of the mechanical output of the engine 22 being supplied to the generator 24, the value of the generated power which is in proportion to the field current If can be obtained from the generator 24. Furthermore, the number of revolutions of the engine 22 can be controlled by this field current If. In this figure, the generator 24 is a three phase alternating current generator, and the generated power of generator 24 is rectified by the rectifier 26 which is provided at the succeeding stage of the generator 24, and is supplied to the battery 14 and the inverter 12. That is, the generated power of the generator 24 can be used to drive the motor 10 and to charge the battery 14.

The operation of the motor 10 and the engine driven generator 20 are controlled by the controller 28. The controller 28 is comprised of the motor controller 30 which is in charge of controlling the motor 10 and the generator controller 32 which is in charge of controlling the engine driven generator 20. The motor controller 30 and the generator controller 32 receive necessary information from each other.

On one hand, the motor controller 30 inputs information such as the accelerator angle representing the vehicle driver's pedal depressing stroke and the brake depressing power which represents the vehicle driver's brake pedal depression strength, and on the other hand it detects the number of revolutions of the motor 10 by the revolution sensor 34 which is provided in the vicinity of the motor 10. The motor controller 30 controls the power conversion by the inverter 12 based on these physical quantities, while monitoring the motor current IM detected by a current sensor 36, and the inverter input current I1 detected by a current sensor 38. Through these operations, the output torque of the motor 10 becomes a value in accordance with the accelerator angle or the brake depressing. From the explanation below, it is obvious that this invention should not be limited according to the details of the operation of the motor controller 30.

The generator controller 32 controls the operation of the engine driven generator 20 while receiving information from the motor controller 30. That is, the generator controller 32 controls the generated power of the generator 24 so that the SOC of the battery 14 is within the target zone, for example, within the range of 70–80%. In this case, as in the above, the generated power of the generator 24 can be controlled by the field current If since the engine 22 is operated at WOT in order to secure a high efficiency operation. Since the number of revolutions of the engine 22 changes according to the field current If, the generator controller 32 refers to information concerning the number of revolutions of the engine 22 when determining the control target of the field current If. Furthermore, regarding the range in which the engine 22 can not be operated at WOT, the generator controller 32 controls the throttle, etc. of the engine 22. In the figure, reference numeral 40 represents the voltage sensor that detects the battery voltage VB, 42 represents the current sensor that detects the output current (which corresponds to the output current of the generator 24) Ig of the rectifier 26, and 44 represents the current sensor that detects the charging or discharging current IB of the battery 14.

b) First Embodiment

Figure 2:
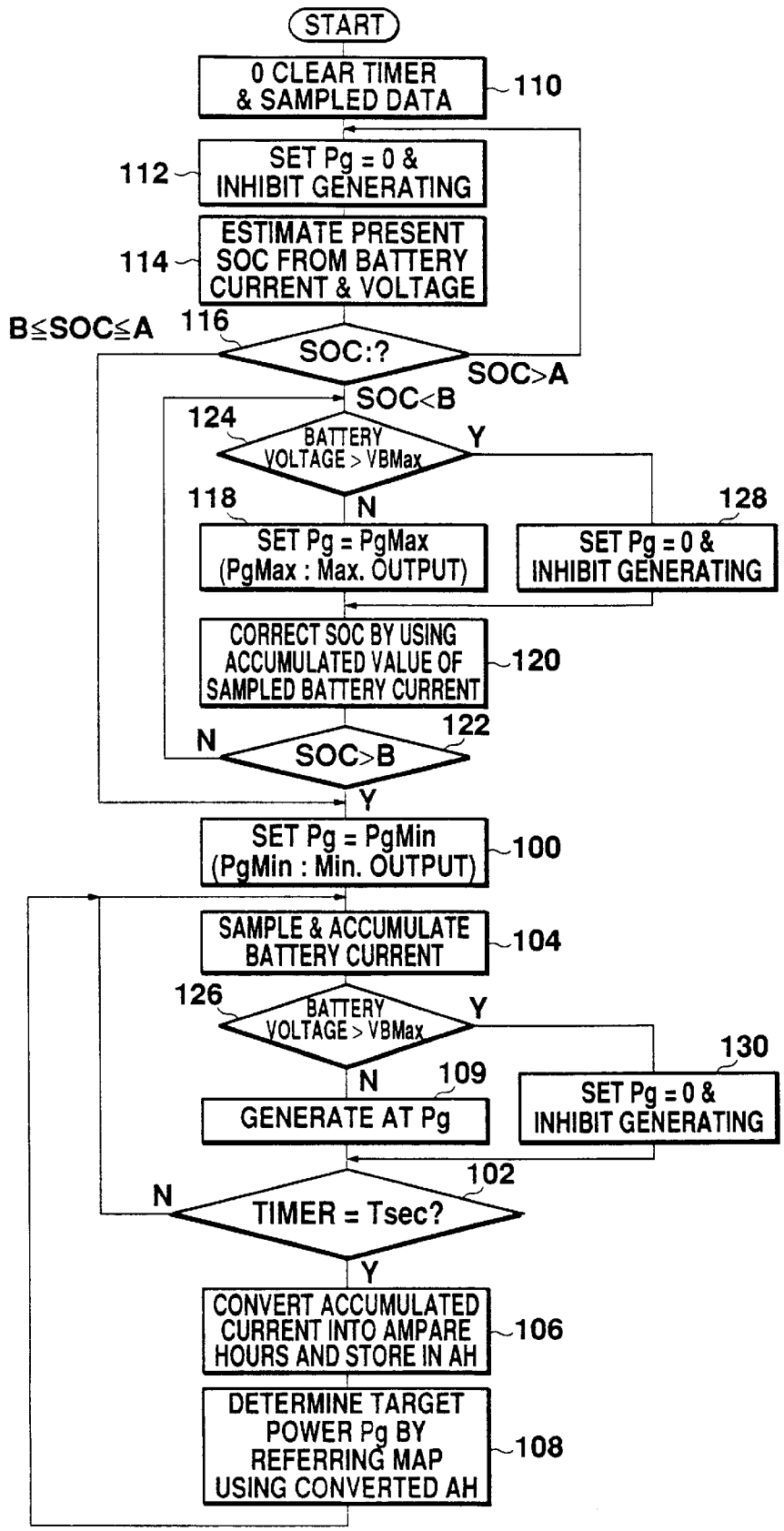
FIG. 2 is a flow chart showing the control procedure carried out by the generator controller in the first embodiment of this invention.

FIG. 2 shows the control procedure carried out by the generator controller 32 in the first embodiment of this invention.

In this embodiment, the generator controller 32 initially sets the minimum generated power PgMin of the generator 24 to the target generated power Pg (100). The minimum generated power PgMin referred to here is the minimum generated power which can operate the engine 22 in WOT mode. Then, the generator controller 32 carries out the generator control (109) until the built-in timer counts T seconds (102). The generator controller 32 samples and accumulates the battery current IB (104) while controlling the generator 24. When the timer counts up T seconds (102), the generator controller 32 converts the accumulated value of the battery current IB to ampere-hours and stores it in AH (106). The generator controller 32 refers to the output map by using the accumulated charged-and-discharged current AH as a reference key, to determine a target generated power (108). Following this, the operation of the generator controller 32 returns to step 104.

Figure 3:
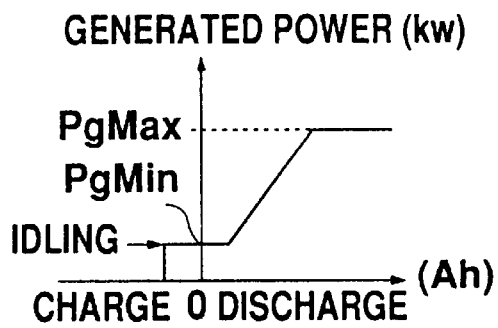
FIG. 3 is a figure showing an example of an output map used in this embodiment.
Figure 4A:
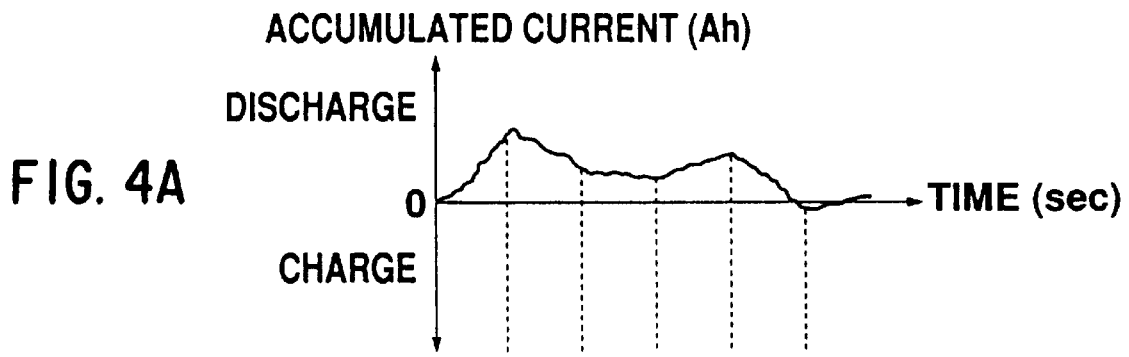
FIG. 4 is a timing chart showing an example of the charging, discharging and generating operation in this embodiment.
Figure 4B:
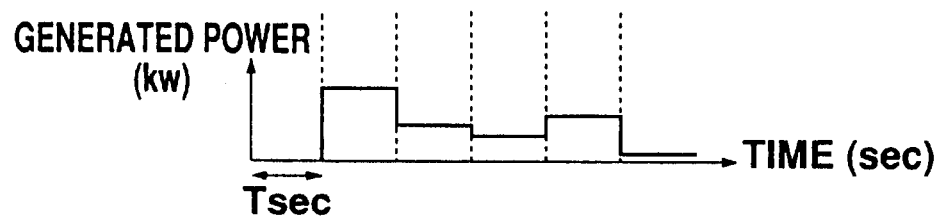

One of the examples of the output map used in step 108 is, shown in FIG. 3. In this map, the accumulated charged-and-discharged current AH of battery 14 and the generated power of the generator 24 are correlated to each other. Furthermore, the generated power of the generator 24 is basically controlled between the minimum generated power PgMin and the maximum generated power PgMax. The maximum generated power PgMax referred to here is the maximum generated power which can be output from generator 24 and is normally set at a value which is one-third that of the available power of the motor 10. By using this type of output map and determining the control target Pg of the generated power, and by controlling the generated power of the generator 24 based on the determined control target Pg, it is possible to control the SOC of the battery 14 more precisely than in the prior art. That is, as shown in FIG. 4 for example, the SOC of the battery 14 can be maintained in the target zone range more precisely than when the target generated power Pg is set according to the accumulated charged-and-discharged power as in the prior art, since the target generated power Pg is set while the fluctuation of the accumulated charged-and-discharged current AH is reflected.

In order to maintain the SOC of battery 14 within the target zone, by this type of control, the SOC of battery 14 must initially be set in the target zone. However, when the SOC of the battery 14 is initially outside the target zone for some reason, the SOC of the battery 14 can not always be controlled in the target zone just through the operation mentioned above. Therefore in this preferred embodiment, the SOC of the battery 14 is adjusted so that it is within the target zone prior to step 100.

In other words, after carrying out a step 110 for initial setting, such as clearing the built-in timer and the sample data, the generator controller 32 produces a condition in which the driving power of the motor 10 is supplied solely by the discharge of the battery 14, by forcibly setting the target generated power (112) to "0". Under this condition, since the discharged power IB of the battery 14 normally becomes markedly large and the value of the concerned discharged current IB gradually increases, the high rate discharging state in which a good correlation exists between the battery voltage VB and the SOC is produced. In the following step 114, an estimate of the SOC based on the battery voltage VB is conducted after waiting for the occurrence of the high rate discharging state. When the estimated initial SOC thus-obtained is within the target zone, that is, when the SOC is larger than or equal to B and less than or equal to A (116), the generator controller 32 carries out the step 100 mentioned above and the succeeding steps. Conversely, when the SOC is larger than the upper limit value A of the target zone or less than the lower limit B, the generator controller 32 carries out the necessary processings as follows.

First, when the SOC estimated in step 114 is greater than the upper limit A of the target zone, the generator controller 32 carries out steps 112 and 114 repeatedly. That is, the condition in which battery 14 is discharged is continuously produced. Through this operation, the SOC of battery 14 will eventually decrease and will enter the target zone, so at that point the operation of the generator controller 32 will branch to step 100 (116).

Next, when the SOC estimated in step 114 is lower than the lower limit B in the target zone (116), the generator controller 32 controls the generator 24 so that the maximum generated power PgMax is obtained from the generator 24, by setting the control target Pg of the generated power to the maximum generated power PgMax (118). When this type of generator control is carried out, the generated power of generator 24 will normally become greater than the driving power required by the motor 10, so the battery 14 will be charged. Also, even if the driving power required by the motor 10 is greater than the maximum generated power PgMax, the generated power will eventually become greater than the driving power of the motor 10 if the generator control is continuously carried out with the maximum generated power PgMax as the target generated power Pg. Therefore, the value obtained in the following step 120 by sampling and accumulating the battery current IB is a value equivalent to the accumulated charged current of the battery 14 after lastly conducting step 114. The generator controller 32 corrects the SOC obtained in step 114 based on the result from accumulating the battery current IB (120). The generator controller 32 judges whether or not the corrected SOC is greater than the lower limit B of the target zone (122). As a result, if it is judged that it has become greater, then the generator controller 32 shifts to step 100, mentioned above. If it is decided that it is not greater, the operation of steps 118 and 120 are repeatedly carried out.

Therefore, according to this embodiment, even when the SOC of the battery 14 is not initially within the target zone for some reason, this can be adjusted to a value within the target zone prior to the generator control based on the accumulated charged-and-discharged current AH. Therefore, no matter what value the SOC of the battery 14 initially has, the SOC can be controlled within the target zone, and the life of the battery 14 can be extended.

Furthermore, in this embodiment, the judgement on the battery voltage VB is conducted after carrying out step 116 and step 104 (124, 126). That is, the generator controller 32 judges whether or not the battery voltage VB detected by the voltage sensor 40 is greater than the permissible maximum battery voltage VBMax (124, 126), and when it is greater, the control target Pg of the generated power is forcibly set to 0 (128, 130). Through this type of control, it is possible to prevent a situation where the battery 14 becomes excessively discharged, and the life of the battery 14 can be extended.

Figure 5:
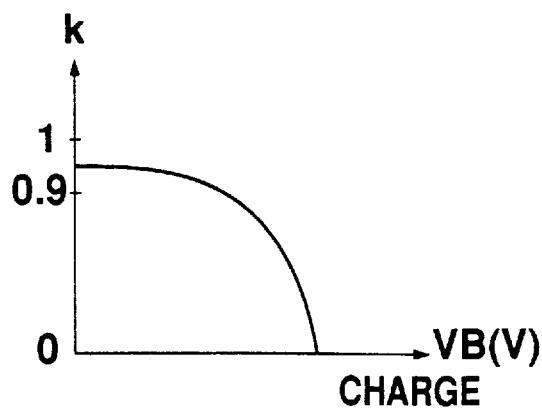
FIG. 5 is a diagram showing voltage characteristics of the efficiency coefficient used in this embodiment.

In addition, in this embodiment, when the battery current IB is accumulated in steps 104 or 120, the efficiency coefficient K shown in FIG. 5 is multiplied by the battery current IB. That is, since the coefficient K that represents the charging and discharging efficiency of the battery 14 is dependent on the battery voltage VB as shown in FIG. 5, there is a risk that the accumulated charged-and-discharged current AH of the battery 14 can not be obtained accurately if the battery current IB is accumulated as it is. Therefore, in this embodiment, the efficiency coefficient K is determined by referring to the correlation with the battery voltage VB shown in FIG. 5 when carrying out steps 104 or 120, and this efficiency coefficient K is multiplied the battery current IB.

As described above, according to this embodiment, it is possible to precisely control the SOC of the battery 14 within the target zone since the generated power of the generator 24 is target controlled by aiming at the accumulated charged-and-discharged current AH, and not on the accumulated charged-and-discharged power, and hence it is possible to extend the life of the battery. Furthermore, in the case of aiming at the accumulated charged-and-discharged power of the battery as in the prior art and carrying out the SOC control of the concerned battery 14, it was necessary to monitor the SOC of the battery 14 through the SOC sensor separately provided, and to control the generated power so that the SOC of the battery 14 did not deviate markedly from the target zone and cause excessive charge or discharge. However, in the case when the control target Pg of the generated power is set according to the accumulated charged-and-discharged current AH, as in this embodiment, the SOC sensor will be unnecessary for such a purpose. Therefore, the ECU (electronic control unit) and the various materials that comprise the SOC sensor can be obviated and a lower cost can be realized. Also, the SOC memory value need not be corrected when the vehicle is at a standstill.

c) Second Embodiment

Figure 6:
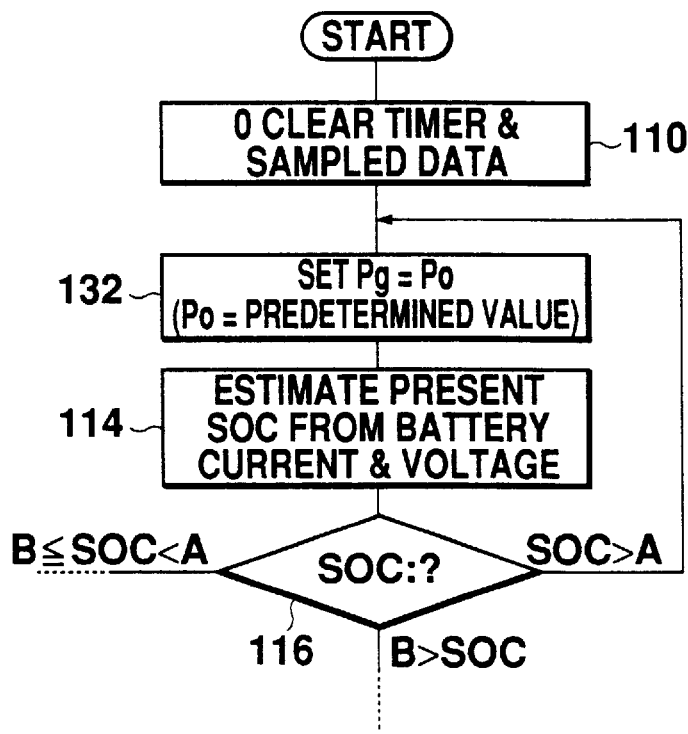
FIG. 6 is a flow chart showing the control procedure carried out by the generator controller in the second embodiment of this invention.

FIG. 6 shows the control procedure to be carried out by the generator controller 32 in the second embodiment of this invention. In this figure, the common parts shared by the control procedure of the first preferred embodiment shown in FIG. 2 are slightly altered.

In this preferred embodiment, step 132 is carried out instead of step 112. In step 132, the P0 satisfying PgMin<P0<PgMax is set at the target generated power Pg of the generator 24 and the generated power is controlled according thereto so that the excessive discharge of the battery 114 is avoided. That is, when setting "0" as the control target Pg in step 112 as in the first embodiment above, there is still a small possibility of the battery 14 becoming excessively discharged if a long time has elapsed without the high rate discharging state occurring. In this embodiment, regarding this, the value P0 which is above 0 is set for the target generated power Pg when the battery 14 is forced into a discharged condition in order to produce a high rate discharging state. Thereby, even if the battery 14 continues to discharge without resulting in a high rate discharging state, a condition of excessive discharge is not likely to be produced. Also, since in this embodiment P0 is set at a value that exceeds the minimum generated power PgMin, even if the setting of the target generated power Pg which involves step 132 is carried out, the fuel consumption of the engine 22 can be maintained since the operating condition of engine 22 will not deviate from WOT.

d) Third Embodiment

Figure 7:
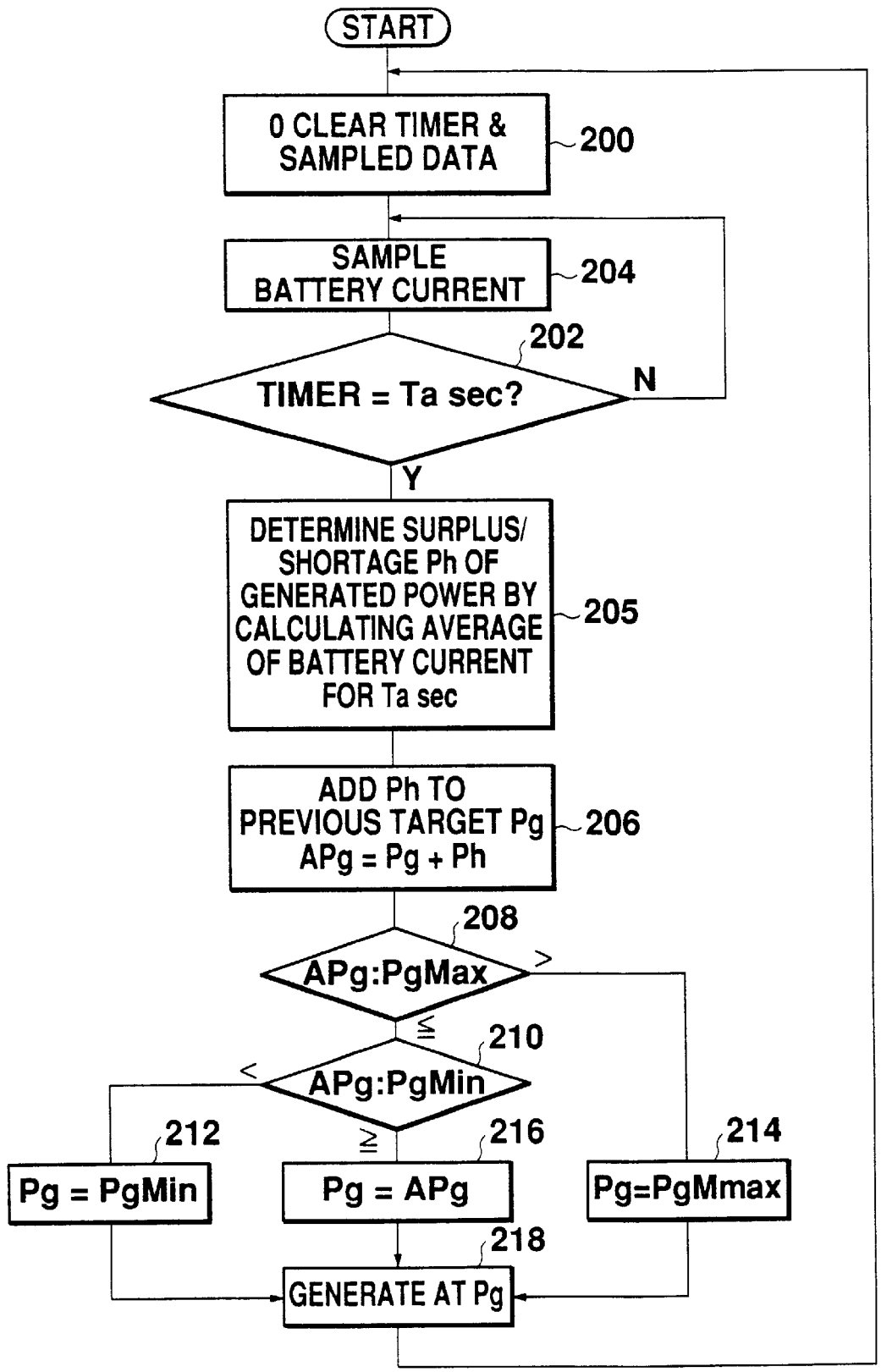
FIG. 7 is a flow chart showing the control procedure carried out by the generator controller in the third embodiment of this invention.

In FIG. 7, the control procedure to be carried out by the generator controller 32 in the third preferred embodiment of this invention is shown. In this embodiment, the target generated power Pg is not set based on the accumulated value of battery current IB during T seconds as in the first and second embodiment above, nor is it based on the accumulated charged-and-discharged current AH; the surplus and shortage of charged output is determined based on the average value Ia of the battery current IB during Ta seconds.

Figure 8:
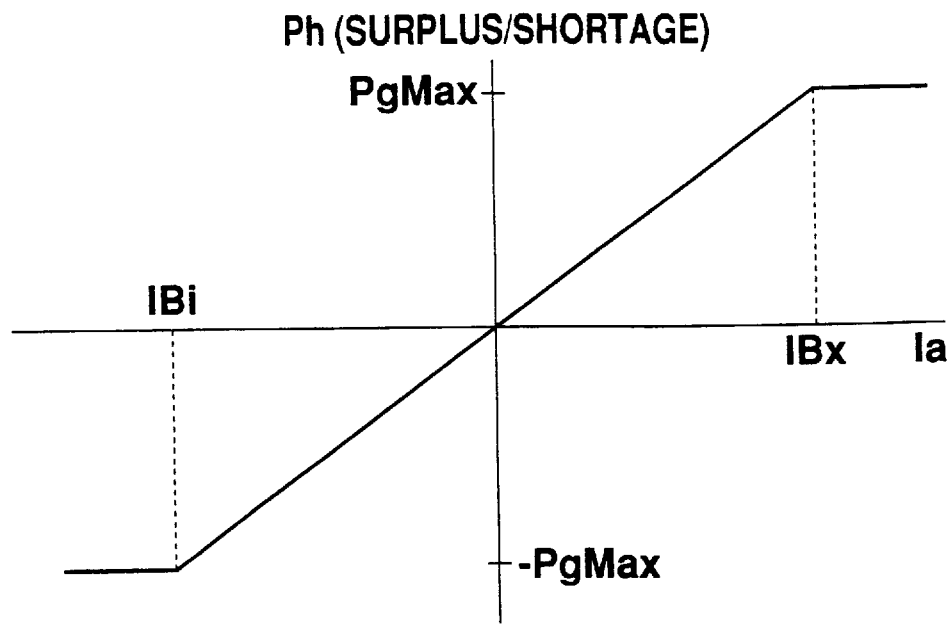
FIG. 8 is a map used to determine the surplus and shortage of generated power in the third embodiment of this invention.

In detail, in this embodiment, after the timer and the sample data are cleared by the generator controller 32 (200), the sampling of the battery current IB is repeatedly carried out (204) until the timer built into the generator controller 32 counts the averaging period of Ta seconds (202). The generator controller 32 calculates the average value Ia of the battery current IB based on the battery current IB which was sampled during Ta seconds, and calculates the surplus and shortage of the generated power Ph (205) by, for example, referring to the map shown in FIG. 8 using the average Ia as a reference key. That is, since the average value Ia of the battery current IB during Ta seconds has a value corresponding to the accumulated charged-and-discharged current of the battery 14, the surplus and shortage of generated power Ph can be determined based thereon. When the surplus and shortage of generated output Ph is determined, the generator controller 32 adds this onto the target generated power Pg which was used previously (206). The generator controller 32 compares the value APg obtained as a result to the maximum generated power PgMax and minimum generated power PgMin (208, 210). As a result, when APg is below the minimum generated power PgMin or above the maximum generated power PgMax, the generator controller 32 sets the minimum generated power PgMin and the maximum generated power PgMax to the control target Pg (212, 214), respectively, and in other cases, that is when APg is greater than or equal to the minimum generated power PgMin and lower than or equal to the maximum generated power PgMax, APg is set to the target generated power Pg (216). The generator controller 32 controls the generated power of the generator 24 (218) in accordance with the target generated power Pg which was set by one of the steps 212–216. After this, the operation of the generator controller 32 returns to step 200.

Figure 9:
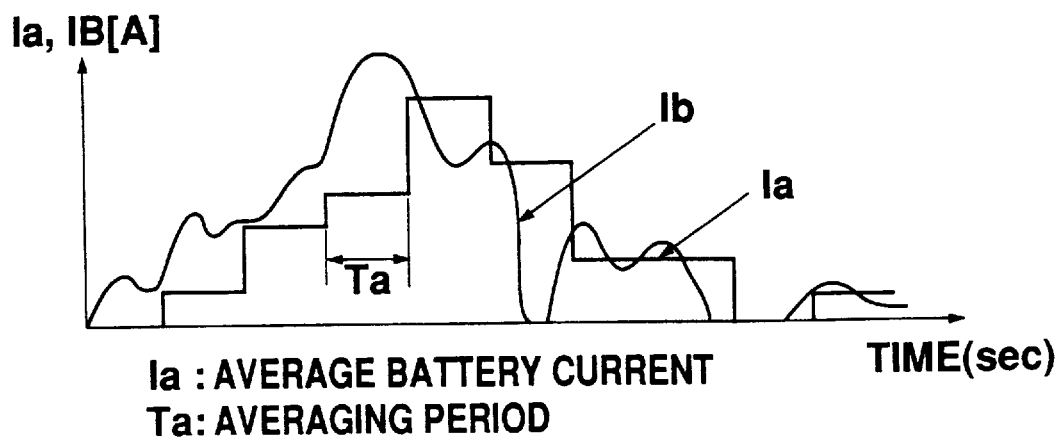
FIG. 9 is a timing chart showing the operations of the battery current and its average in the third embodiment of this invention.

Therefore, in this embodiment, when the accumulated charged-and-discharged current IB of the battery 14 varies, as shown in FIG. 9 for example, the average current value Ia of the battery which was obtained during the previous averaging period Ta will be reflected in the control of the generated power. As a result, a more precise SOC control can be realized compared to the SOC control focusing on the accumulated charged-and-discharged power, as in the first and second embodiment.

e) Fourth Embodiment

Figure 10:
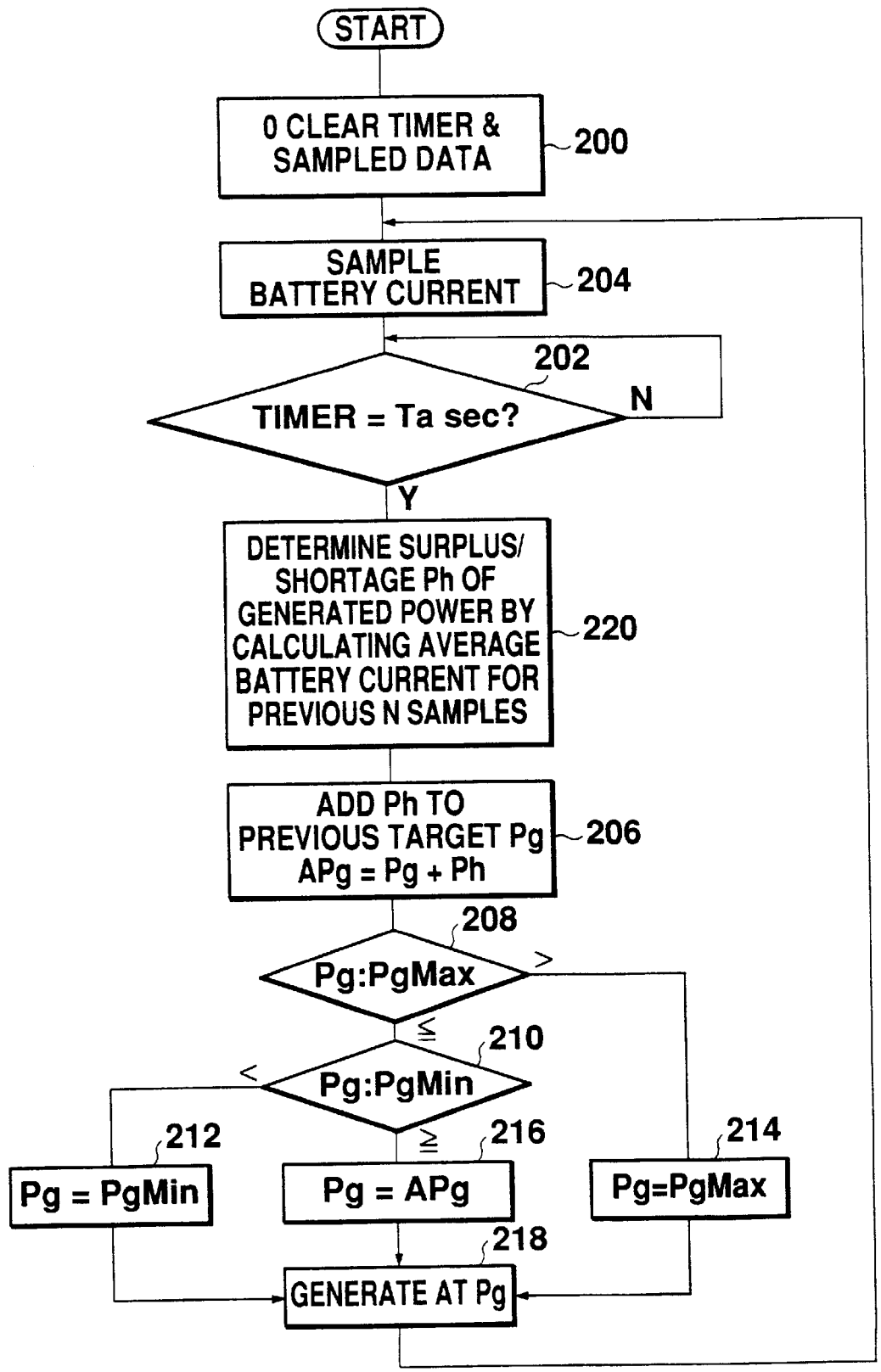
FIG. 10 is a flow chart showing the control procedure carried out by the generator controller in the fourth embodiment of this invention.

FIG. 10 shows the control procedure to be carried out by the generator controller 32 in the fourth embodiment of this invention. Unlike the third embodiment, where the average current Ia during Ta seconds is obtained and is used to set the target generated power Pg, in the present embodiment, based on the battery current IB sampled at a previous timing N with an interval of every T seconds (202, 204), the average value of the battery current IB is obtained and the surplus and shortage of generated power Ph is determined according to this average value (220). The control operation of the generated power based on the determined surplus and shortage of generated power Ph is the same as the third embodiment. However, after step 218 is carried out, the operation returns to step 204.

Therefore, in this preferred embodiment, the moving average of the battery current IB during the previous NxT seconds is to be used, and not the average value during Ta seconds, as in the third embodiment. Besides, being able to obtain the same effect as in the third embodiment by employing this type of control procedure, it is possible to further smoothen the change in the number of engine rotations compared to the third embodiment. That is, in the third embodiment, the generated power of the generator 24 changes rapidly step by step every Ta seconds, but since the generated power will change every Ta seconds which is shorter than T seconds, the change in the generated power will be more gradually and small, and therefore the change in the number of engine rotations will be gradual and small. As a result, the deterioration of the fuel consumption produced when the number of engine rotations changes, and the deterioration of the emissions can be prevented. In addition, the drive feeling becomes better since the change in the number of engine rotations is small.

We claim:

1. A generator controller used in a hybrid electric vehicle comprising a motor for propelling the hybrid electric vehicle, a battery capable of being charged and discharged, and a generator for producing a generated power having a value according to a command, a discharged power from the battery and the generated power of the generator being used as a driving power of the motor and a surplus of the generated power, relative to the driving power, being used as a charging power of the battery, the generator controller comprising:

means for detecting a charging current and a discharged current;

means for detecting a change in a state of charge of the battery on the basis of the charging current and the discharged current;

means for determining a target generated power based on a change in the state of charge; and means for controlling the generated power according to the target generated power.

2. The generator controller as defined by claim 1, further comprising:

means for detecting a voltage of the battery; and means for inhibiting a target control of said generated power according to the target generated power when the voltage of the battery exceeds a limit value.

3. The generator controller as defined by claim 1, wherein the means for detecting the change in the state of charge, includes means for detecting an accumulated charged-and-discharged current of the battery by accumulating the charging current and the discharged current for every predetermined time period; and wherein the means for determining the target generated power includes means for determining the target generated power based on said accumulated charged-and-discharged current.

4. The generator controller as defined by claim 3, wherein when accumulating the charging current and the discharged current, an efficiency coefficient representing a voltage dependency of a charged-and-discharged efficiency of the battery is multiplied by the battery current.

5. The generator controller as defined by claim 3, further, comprising:

means for forcibly setting a first initial value to an initial target generated power, the first initial value being greater than a minimum generated power which is capable of being generated by the generator and less than the driving power prior to a target control of the generated power according to the target generated power;

means for controlling said generated power according to the initial target generated power;

means for detecting, based on said charging current and the discharged current, an appearance of a high rate discharging state where the discharged current of the battery is greater than a predetermined value and is increasing, when the generated power is controlled according to said initial target generated power;

means for detecting a voltage of the battery;

means for detecting the state of charge of the battery as an initial state of charge based on the voltage of the battery when the high rate discharging state has occurred; and means for carrying out a target control of said generated power according to the target generated power when said initial state of charge is within a target zone.

6. The generator controller as defined by claim 5, wherein said hybrid electric vehicle further comprises an engine for driving the generator and being operated in a wide-open-throttle condition;

said minimum generated power being a minimum power needed to maintain operation of the engine in the wide-open-throttle condition.

7. The generator controller as defined by claim 5, wherein the first initial value is forcibly set to the initial target generated power when starting said hybrid electric vehicle.

8. The generator controller as defined by claim 5, wherein said first initial value is above 0 and is a value below a maximum generated power which is capable of being generated by the generator.

9. The generator controller as defined by claim 5, further comprising:

means for setting said minimum generated power to the target generated power, prior to carrying out the target control of said generated power according to the target generated power, when said initial state of charge is within the target zone.

10. The generator controller as defined by claim 5, further comprising:

means for forcibly setting a second initial value to said initial target generated power when said initial state of charge has a value greater than any value belonging to said target zone, the second initial value being above said minimum generated power and less than said driving power.

11. The generator controller as defined by claim 10, wherein the second initial value is above 0 and is below the maximum power which is capable of being generated by the generator.

12. The generator controller as defined by claim 5, further comprising:

means for forcibly setting a third initial value to said initial target generated power when said initial state of charge has a value less than any of the values belonging to said target zone, and said driving power is below the maximum generated power which is capable of being generated by the generator, the third initial value being above the driving power and below the maximum generated power.

13. The generator controller as defined by claim 12, further comprising:

means for inhibiting the target control of said generated power according to the initial target generated power when the third initial value is forcibly set to said initial target generated power and the voltage of the battery is above the limit value.

14. The generator controller as defined by claim 5, further comprising:

means for forcibly setting a third initial value, which is equivalent to a maximum generated power, to the initial target generated power when said initial state of charge has a value less than any of the values belonging to said target zone and said driving power is above the maximum generated power which is capable of being generated by the generator.

15. The generator controller as defined by claim 14, further comprising:

means for inhibiting the target control of said generated power according to the initial target generated power, when the third initial value is forcibly set to said initial target generated power and the voltage of the battery is above the limit value.

16. The generator controller as defined by claim 1, wherein said means for detecting the change in the state of charge includes means for obtaining an average of the charging current and the discharged current for every period;

and said means for determining target generated power, includes:

means for obtaining a surplus and shortage of the generated power, relative to a power required to maintain the state of charge of the battery, based on said average; and means for determining the target generated power based on the surplus and shortage of the generated power.

17. The generator controller as defined by claim 16, wherein said means for determining the target generated power further comprises:

means for determining a candidate target generated power that should be used as the target generated power in a next period, by adding the target generated power used in a previous period and the surplus and shortage of the generated power obtained involving the most recent period; and means for setting the candidate target generated power to the target generated power for the next period when the candidate target generated power is above the minimum generated power and below the maximum generated power which are capable of being generated by the generator.

18. The generator controller as defined by claim 17, wherein said means for determining the target generated power further comprises:

means for setting the minimum generated power to the target generated power for the next period when the candidate target generated power is less than the minimum generated power.

19. The generator controller as defined by claim 17, wherein said means for determining the target generated power further comprises:

means for setting the maximum generated power to the target generated power for the next period when the candidate target generated power is above the maximum generated power.

20. The generator controller as defined by claim 16, wherein said means for detecting the change in the state of charge comprises:

means for obtaining the average of the charging current and the discharged current by carrying out a moving average calculation thereof for a predetermined unit cycle.

* * * * *